United States Patent
Yin

(12) 
(10) Patent No.: US 9,626,532 B2
(45) Date of Patent: Apr. 18, 2017

(54) ELECTRONIC DEVICE AND METHOD FOR UNLOCKING TOUCH SCREEN THEREOF

(71) Applicant: Chiun Mai Communication Systems, Inc., New Taipei (TW)

(72) Inventor: Chen-Hsuan Yin, New Taipei (TW)

(73) Assignee: Chiun Mai Communication Systems, Inc., New Taipei (TW)

(*) Notice: Subject to any disclaimer, the term of this patent is extended or adjusted under 35 U.S.C. 154(b) by 0 days.

(21) Appl. No.: 14/471,256

(22) Filed: Aug. 28, 2014

(65) Prior Publication Data

US 2015/0062039 A1  Mar. 5, 2015

(30) Foreign Application Priority Data

Aug. 28, 2013 (CN) .......................... 2013 1 0380394

(51) Int. Cl.
  *G06F 3/041* (2006.01)
  *G06F 21/82* (2013.01)
  *G06F 21/36* (2013.01)

(52) U.S. Cl.
  CPC .............. *G06F 21/82* (2013.01); *G06F 21/36* (2013.01)

(58) Field of Classification Search
  CPC ........ G06F 3/0416; G06F 21/82; G06F 21/36; G06F 3/041
  USPC .................................................. 345/173–174
  See application file for complete search history.

(56) References Cited

U.S. PATENT DOCUMENTS

| | | | |
|---|---|---|---|
| 2013/0147795 A1* | 6/2013 | Kim ........................ | G06F 21/36 345/419 |
| 2013/0219295 A1* | 8/2013 | Feldman ............... | G06F 3/0481 715/751 |
| 2014/0317499 A1* | 10/2014 | Oh ....................... | G06F 3/04815 715/702 |
| 2015/0035786 A1* | 2/2015 | Schuh ................... | G06F 3/0416 345/174 |

* cited by examiner

*Primary Examiner* — Towfiq Elahi
(74) *Attorney, Agent, or Firm* — Steven M. Reiss

(57) ABSTRACT

In a method for unlocking a touch screen of an electronic device, a cube is generated for unlocking the touch screen, and an unlocking mode of each surface of the cube is set. The cube is displayed on the touch screen for receiving touch signals. After the touch signals are received from each surface of the cube, a touch mode of each surface of the cube are obtained based on the touch signals. The touch screen of the electronic device is unlocked when the touch mode of each surface of the cube is in accordance with the unlocking mode of each surface of the cube.

15 Claims, 3 Drawing Sheets

ELECTRONIC DEVICE AND METHOD FOR UNLOCKING TOUCH SCREEN THEREOF

CROSS-REFERENCE TO RELATED APPLICATIONS

This application claims priority to Chinese Patent Application No. 201310380394.3 filed on Aug. 28, 2013, the contents of which are incorporated by reference herein.

FIELD

Embodiments of the present disclosure relate to electronic device unlocking technology.

BACKGROUND

A touch screen of an electronic device can be unlocked by a variety of unlocking mechanisms, including entering a password or sliding fingers in a specific pattern across the touch screen. However, there is a possibility that the unlocking mechanisms can be remembered by other people who see fingers movement on the touch screen.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
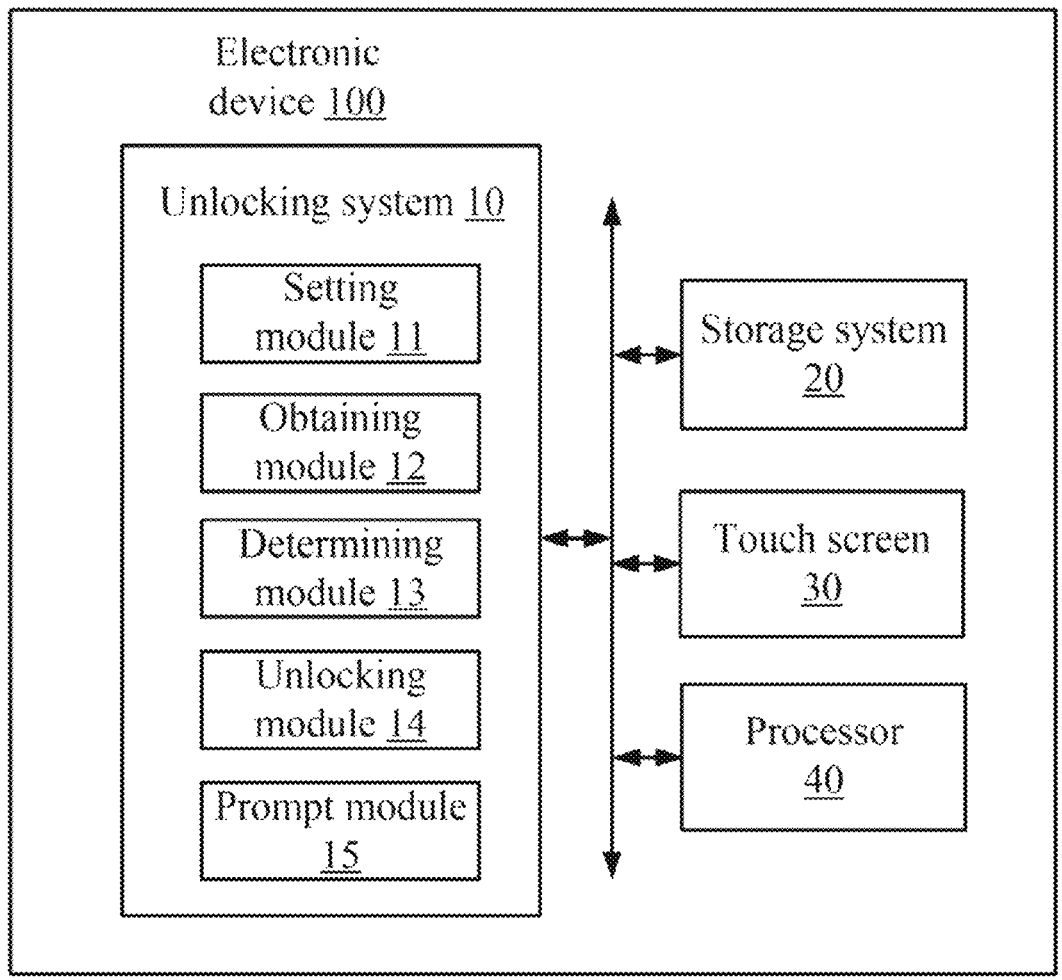
FIG. 1 is a block diagram of one embodiment of an electronic device including an unlocking system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The present disclosure is illustrated by way of examples and not by way of limitation. It should be noted that references to "an" or "one" embodiment in this disclosure are not necessarily to the same embodiment, and such references mean "at least one."

Furthermore, the term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives.

FIG. 1 illustrates a block diagram of one embodiment of an electronic device 100. Depending on the embodiment, the electronic device 100 includes an unlocking system 10. In one embodiment, the electronic device 100 can be a tablet computer, a notebook computer, a personal digital assistant device, a mobile phone, or any other electronic device which has a touch screen 30. The touch screen 30 can recognize touches of a finger (hereinafter abbreviated as "finger touches") of a user, and transmit touch signals accordingly. The electronic device 100 further includes, but is not limited to, a storage system 20 and at least one processor 40.

In at least one embodiment, the storage system 20 can include various types of non-transitory computer-readable storage media. For example, the storage system 20 can be an internal storage system, such as a flash memory, a random access memory (RAM) for temporary storage of information, and/or a read-only memory (ROM) for permanent storage of information. The storage system 20 can also be an external storage system, such as a hard disk, a storage card, or a data storage medium. The at least one processor 40 can be a central processing unit (CPU), a microprocessor, or other data processor chip that performs functions of the electronic device 100.

In at least one embodiment, the unlocking system 10 can include a setting module 11, an obtaining module 12, a determining module 13, an unlocking module 14, and a prompt module 15. The function modules 11-15 can include computerized code in the form of one or more programs, which are stored in the storage system 20. The at least one processor 40 executes the computerized code to provide functions of the function modules 11-15.

The setting module 11 is configured to generate a cube for unlocking the touch screen 30, and set an unlocking mode of each surface of the cube.

A detailed description of setting the unlocking mode of each surface of the cube is as follows.

First, each surface of the cube is identified in a default manner. The default manner can be painting each surface of the cube in different colors, or displaying different icons or numerals on each surface of the cube. For example, when each surface of the cube is identified by being painted different colors, the upper surface of the cube is painted red, the lower surface of the cube is painted green, the front surface of the cube is painted black, the rear surface of the cube is painted white, the left surface of the cube is painted blue, and the right surface of the cube is painted pink.

Figure 3:
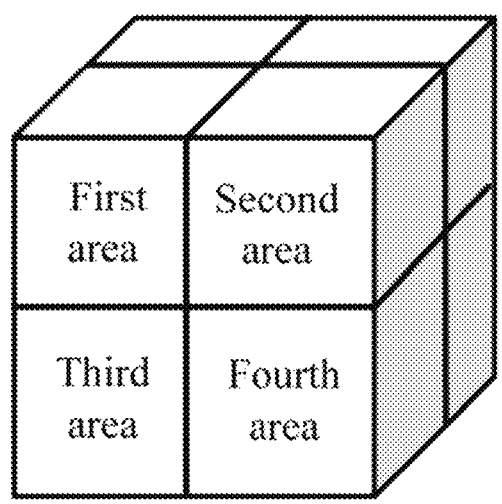
FIG. 3 is a diagrammatic view of one embodiment of a cube for unlocking the touch screen of the electronic device in FIG. 1.

Second, each surface of the cube is partitioned in a plurality of areas by using a partition rule, and a switching mode of each of the areas is set on each surface of the cube. In FIG. 3 for example, each surface of the cube is partitioned in four areas. The switching mode of each of the areas on one surface of the cube constitutes an unlocking mode of the surface of the cube. A switching mode of one area identifies a status of the area for unlocking the touch screen 30. In one embodiment, the switching mode of each of the areas can be an opening mode or a closing mode, and the switching mode of each of the areas is defaulted to be set as the opening mode. When one area of the areas receives a touch signal on the touch screen 30, each switching mode from which area the touch signal is received is switched from the opening mode to the closing mode, or from the closing mode to the opening mode.

Third, the unlocking mode of each surface of the cube is determined based on the switching mode of each of the areas on each surface of the cube. In the example shown in FIG. 3, when four areas of a front surface of the cube are respectively named as a first area, a second area, a third area, and a fourth area, an unlocking mode of the front surface of the cube is denoted as {(the first area, the opening mode), (the second area, the closing mode), (the third area, the opening mode), (the fourth area, the closing mode)}.

In other embodiments, the unlocking mode of each surface of the cube can be pre-determined by a manufacturer of the electronic device 100. That is, setting the unlocking mode of each surface of the cube as mentioned above can be set as a default function.

When the touch screen 30 of the electronic device 100 needs to be unlocked, the obtaining module 12 is configured to display the cube on the touch screen 30 for receiving touch signals. Each surface of the cube has already been identified in the default manner. In one embodiment, each surface of the cube on the touch screen 30 is partitioned in the plurality of areas by using the partition rule. When each surface of the cube on the touch screen 30 is not partitioned in the plurality of areas by using the partition rule, a prompt is generated for partitioning each surface of the cube, and each surface of the cube is partitioned in the plurality of areas by using the partition rule.

The obtaining module 12 is further configured to receive the touch signals from each surface of the cube when one or more finger touches are applied to each surface of the cube, and obtain a touch mode of each surface of the cube based on the touch signals on each surface of the cube. In one embodiment, a finger touch is applied to one area of the areas on each surface of the cube, and a touch signal corresponding to the finger touch switches a switching mode of the area from the opening mode to the closing mode or from the closing mode to the opening mode. The touch mode of each surface of the cube is constituted by switching modes of the areas on each surface of the cube.

The determining module 13 is configured to determine whether the touch mode of each surface of the cube is in accordance with the unlocking mode of each surface of the cube. In the embodiment, when touch modes of all surfaces of the cube are the same as unlocking modes of all surfaces of the cube accordingly, the determining module 13 determines that the touch mode of each surface of the cube is in accordance with the unlocking mode of each surface of the cube. When touch modes of one or more surfaces of the cube is different from unlocking modes of one or more surfaces of the cube accordingly, the determining module 13 determines that the touch mode of each surface of the cube is not in accordance with the unlocking mode of each surface of the cube. For example, when a touch mode of the front surface of the cube is different from an unlocking mode of the front surface of the cube, then the determining module 13 determines that the touch mode of each surface of the cube is not in accordance with the unlocking mode of each surface of the cube.

When a determination is made that the touch mode of each surface of the cube is in accordance with the unlocking mode of each surface of the cube, the unlocking module 14 is configured to unlock the touch screen 30 of the electronic device 100.

When a determination is made that the touch mode of each surface of the cube is not in accordance with the unlocking mode of each surface of the cube, the prompt module 15 is configured to generate a prompt to the user for failing to unlock the touch screen 30 of the electronic device 100.

Figure 2:
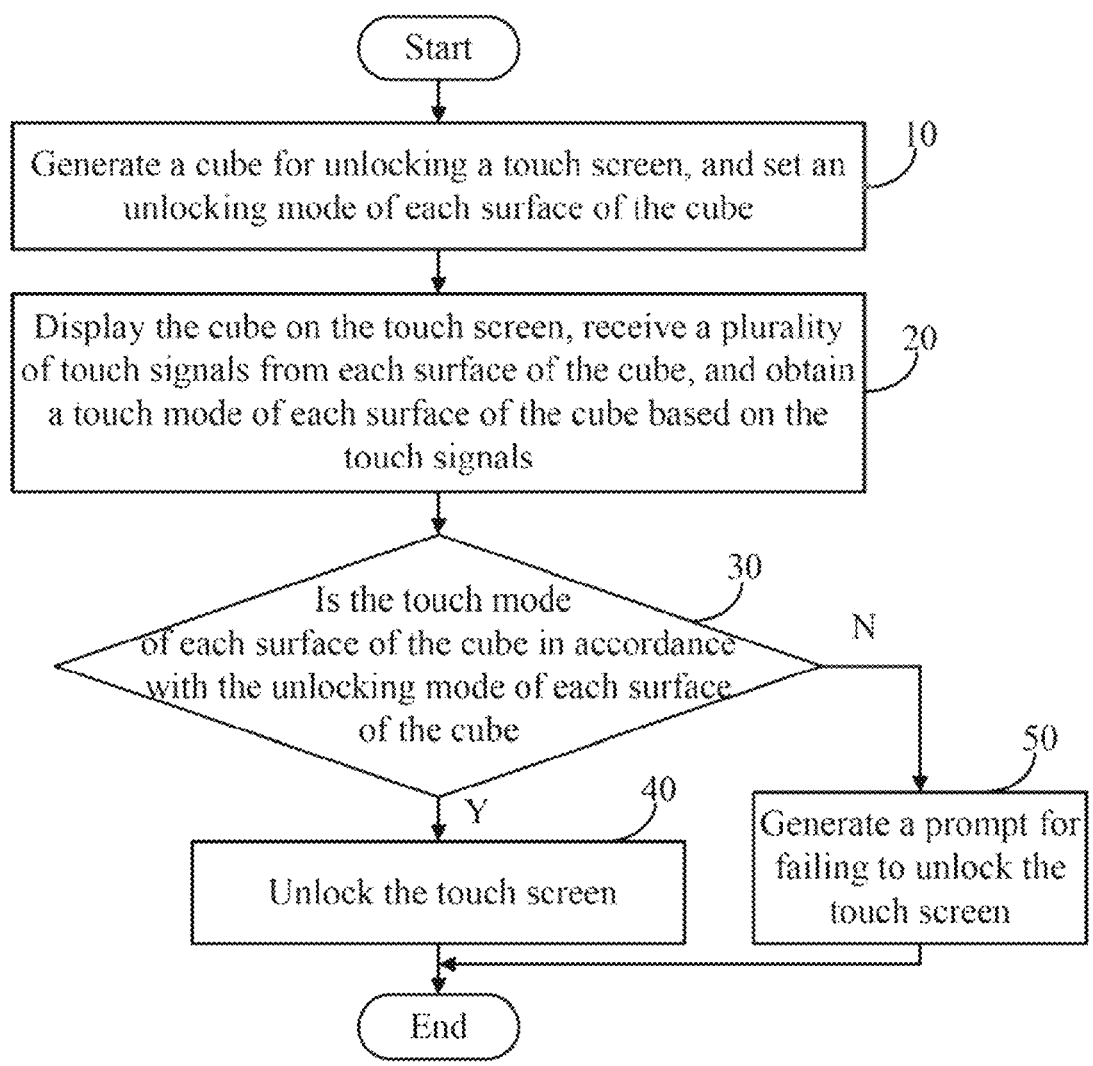
FIG. 2 illustrates a flowchart of one embodiment of a method for unlocking a touch screen of the electronic device in FIG. 1.

Referring to FIG. 2, a flowchart is presented in accordance with an example embodiment. The example method is provided by way of example, as there are a variety of ways to carry out the method. The method described below can be carried out using the configurations illustrated in FIG. 1, for example, and various elements of these figures are referenced in explaining example method. Each block shown in FIG. 2 represents one or more processes, methods, or subroutines, carried out in the exemplary method. Additionally, the illustrated order of blocks is by example only and the order of the blocks can be changed. The exemplary method can begin at block 10. Depending on the embodiment, additional blocks can be added, others removed, and the ordering of the blocks can be changed.

In block 10, a setting module generates a cube for unlocking a touch screen, and sets an unlocking mode of each surface of the cube.

In block 20, an obtaining module displays the cube on the touch screen, receives a plurality of touch signals from each surface of the cube when one or more finger touches are applied to each surface of the cube, and obtains a touch mode of each surface of the cube based on the touch signals on each surface of the cube.

In block 30, a determining module determines whether the touch mode of each surface of the cube is in accordance with the unlocking mode of each surface of the cube. When the touch mode of each surface of the cube is in accordance with the unlocking mode of each surface of the cube, block 40 is executed. When the touch mode of each surface of the cube is not in accordance with the unlocking mode of each surface of the cube, block 50 is executed.

In block 40, an unlocking module unlocks the touch screen of the electronic device.

In block 50, a prompt module generates a prompt to the user for failing to unlock the touch screen of the electronic device.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. A processor-implemented method for unlocking a touch screen of an electronic device, the method comprising:
   generating a cube for unlocking the touch screen;
   setting an unlocking mode of each surface of the cube;
   displaying the cube on the touch screen, wherein each surface of the cube is partitioned in a plurality of areas, wherein a switching mode of any one of the plurality of areas is switchable from an opening mode to a closing mode or from the closing mode to the opening mode in response to a touch signal received by the one of the plurality of areas;
   obtaining a touch mode of each surface of the cube, wherein the touch mode of each surface of the cube is constituted by the switching mode of each of the plurality of areas on each surface of the cube;

determining, at a processor of the electronic device, whether the touch mode of each surface of the cube is in accordance with the unlocking mode of each surface of the cube; and unlocking the touch screen of the electronic device when the touch mode of each surface of the cube is in accordance with the unlocking mode of each surface of the cube;

wherein the unlocking mode of each surface of the cube is set by operations comprising:

identifying each surface of the cube in a default manner;

partitioning each surface of the cube in a plurality of areas by using a partition rule;

setting the switching mode of each of the plurality of areas on each surface of the cube; and determining the unlocking mode of each surface of the cube based on the switching mode of each of the plurality of areas on each surface of the cube.

2. The method according to claim 1, further comprising:

generating a prompt for failing to unlock the touch screen of the electronic device when the touch mode of each surface of the cube is not in accordance with the unlocking mode of each surface of the cube.

3. The method according to claim 1, wherein each surface of the cube displayed on the touch screen is partitioned in the plurality of areas by using a partition rule.

4. The method according to claim 1, further comprising:

generating a prompt for partitioning each surface of the cube when each surface of the cube displayed on the touch screen is not partitioned in a plurality of areas; and partitioning each surface of the cube in the plurality of areas by using a partition rule.

5. An electronic device for unlocking a touch screen of an electronic device, the electronic device comprising:

at least one processor; and a storage system that stores one or more programs, when executed by the at least one processor, cause the at least one processor to:

generate a cube for unlocking the touch screen, wherein each surface of the cube is partitioned in a plurality of areas;

set an unlocking mode of each surface of the cube;

display the cube on the touch screen, wherein a switching mode of any one of the plurality of areas is switchable from an opening mode to a closing mode or from the closing mode to the opening mode in response to a touch signal received by the one of the plurality of areas;

obtain a touch mode of each surface of the cube, wherein the touch mode of each surface of the cube is constituted by the switching mode of each of the plurality of areas on each surface of the cube;

determine whether the touch mode of each surface of the cube is in accordance with the unlocking mode of each surface of the cube; and unlock the touch screen of the electronic device when the touch mode of each surface of the cube is in accordance with the unlocking mode of each surface of the cube;

wherein the unlocking mode of each surface of the cube is set by operations comprising:

identifying each surface of the cube in a default manner;

partitioning each surface of the cube in a plurality of areas by using a partition rule;

setting the switching mode of each of the plurality of areas on each surface of the cube; and determining the unlocking mode of each surface of the cube based on the switching mode of each of the plurality of areas on each surface of the cube.

6. The electronic device according to claim 5, wherein the one or more programs further cause the at least one processor to:

generate a prompt for failing to unlock the touch screen of the electronic device when the touch mode of each surface of the cube is not in accordance with the unlocking mode of each surface of the cube.

7. The electronic device according to claim 5, wherein each surface of the cube displayed on the touch screen is partitioned in the plurality of areas by using a partition rule.

8. The electronic device according to claim 5, wherein the one or more programs further cause the at least one processor to:

generate a prompt for partitioning each surface of the cube when each surface of the cube displayed on the touch screen is not partitioned in a plurality of areas; and partition each surface of the cube in the plurality of areas by using a partition rule.

9. A non-transitory storage medium having stored thereon instructions that, when executed by a processor of an electronic device, causes the processor to perform a method for unlocking a touch screen of the electronic device, wherein the method comprises:

generating a cube for unlocking the touch screen;

setting an unlocking mode of each surface of the cube;

displaying the cube on the touch screen, wherein each surface of the cube is partitioned in a plurality of areas, wherein a switching mode of any one of the plurality of areas is switchable from an opening mode to a closing mode or from the closing mode to the opening mode in response to a touch signal received by the one of the plurality of areas;

obtaining a touch mode of each surface of the cube, wherein the touch mode of each surface of the cube is constituted by the switching mode of each of the plurality of areas on each surface of the cube;

determining, at the processor, whether the touch mode of each surface of the cube is in accordance with the unlocking mode of each surface of the cube; and unlocking the touch screen of the electronic device when the touch mode of each surface of the cube is in accordance with the unlocking mode of each surface of the cube;

wherein the unlocking mode of each surface of the cube is set by operations comprising:

identifying each surface of the cube in a default manner;

partitioning each surface of the cube in a plurality of areas by using a partition rule;

setting the switching mode of each of the plurality of areas on each surface of the cube; and determining the unlocking mode of each surface of the cube based on the switching mode of each of the plurality of areas on each surface of the cube.

10. The non-transitory storage medium according to claim 9, wherein the method further comprises:

generating a prompt for failing to unlock the touch screen of the electronic device when the touch mode of each surface of the cube is not in accordance with the unlocking mode of each surface of the cube.

11. The non-transitory storage medium according to claim 9, wherein each surface of the cube displayed on the touch screen is partitioned in the plurality of areas by using a partition rule.

12. The non-transitory storage medium according to claim 9, wherein the method further comprises:
generating a prompt for partitioning each surface of the cube when each surface of the cube displayed on the touch screen is not partitioned in a plurality of areas; and
partitioning each surface of the cube in the plurality of areas by using a partition rule.

13. The method according to claim 1, wherein the unlocking mode comprises areas which are touched in sequence and the switching mode of the areas which are touched.

14. The electronic device according to claim 5, wherein the unlocking mode comprises areas which are touched in sequence and the switching mode of the areas which are touched.

15. A processor-implemented method for unlocking a touch screen of an electronic device, the method comprising:
displaying a plurality of surfaces on the touch screen, wherein each of the surfaces is partitioned in a plurality of areas, wherein a switching mode of any one of the plurality of areas is switchable from an opening mode to a closing mode or from the closing mode to the opening mode in response to a touch signal received by the one of the plurality of areas;
setting an unlocking mode of each of the surfaces;
obtaining a touch mode of each of the surfaces, wherein the touch mode of each of the surfaces is constituted by the switching mode of each of the plurality of areas on each of the surfaces;
determining, at a processor of the electronic device, whether the touch mode of each of the surfaces is in accordance with the unlocking mode of each of the surfaces; and
unlocking the touch screen of the electronic device when the touch mode of each of the surfaces is in accordance with the unlocking mode of each of the surfaces;
wherein the unlocking mode of each surface of a cube is set by operations comprising:
identifying each surface of the cube in a default manner;
partitioning each surface of the cube in a plurality of areas by using a partition rule;
setting the switching mode of each of the plurality of areas on each surface of the cube; and
determining the unlocking mode of each surface of the cube based on the switching mode of each of the plurality of areas on each surface of the cube.

* * * * *